United States Patent Office 2,806,062
Patented Sept. 10, 1957

2,806,062
PROCESS FOR THE MANUFACTURE OF DIPHENYLUREA

Bernard Gehauf, Edgewood Arsenal, and Edgar M. Faber, Baltimore, Md., assignors to the United States of America as represented by the Secretary of War, as trustee No Drawing. Application June 19, 1937,
Serial No. 149,239

2 Claims. (Cl. 260—553)

(Granted under Title 35, U. S. Code (1952), sec. 266)

The invention described herein may be manufactured and used by or for the Government for governmental purposes, without the payment of any royalty thereon.

This invention relates to a process for the manufacture of diphenylurea or carbanilide.

Diphenylurea has heretofore been prepared from the reaction of phosgene on aniline, the reaction being carried out in the dry state to thus obtain a solid mixture of aniline hydrochloride and diphenylurea. The hydrochloride was then washed out with hot water. The yield of diphenylurea was low and the product required considerable purification.

One object of this invention is to provide a process for the manufacture of diphenylurea whereby a high yield is obtained and the purity of the diphenylurea is excellent.

Another object of this invention is to provide a process for the manufacture of diphenylurea in the presence of water, thus avoiding the formation of undesirable impurities.

These and other objects of the invention will be apparent from the following description and appended claims.

The action of phosgene on aniline to form diphenylurea is

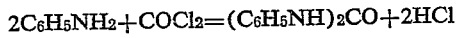

$$2C_6H_5NH_2 + COCl_2 = (C_6H_5NH)_2CO + 2HCl$$

In accordance with the present invention, the reaction is carried out in water in the presence of an agent to effectively neutralize the hydrochloric acid. The diphenylurea thus obtained requires no purification.

The neutralizing agent for hydrochloric acid may be sodium acetate, soda ash (sodium carbonate) or any substance capable of reacting with or neutralizing the hydrochloric acid formed. The neutralizing agent such as soda ash is dissolved in water, the aniline is then added, and the phosgene is passed into the mixture which is kept well agitated. The reaction is exothermic and mild cooling is required to avoid the tendency of phosgene to hydrolize. The temperature should preferably be maintained below about 60° C. and a range of 35 to 40° C. has been found suitable and may readily be maintained by a jacket of tap water at ordinary temperatures.

Using sodium carbonate as the neutralizing agent, the reaction is as follows:

$$2C_6H_5NH_2 + COCl_2 + Na_2CO_3 = (C_6H_5NH)_2CO + 2NaCl + H_2O + CO_2$$

The reaction may be carried out in a jacketed iron kettle equipped with a thermometer well, charging manhole, exhaust line, feed line for phosgene, and an efficient agitator. Vigorous agitation during the operation is important.

A specific example of the reaction is as follows:

Reaction charge:
- Aniline_____ 465 g.
- Phosgene_____ 270 g. (10% excess).
- Soda ash_____ 380 g. (80% Na₂CO₃—15% excess).
- Water_____ 2500 g.

While the soda ash, aniline and water are kept well agitated the phosgene is passed into the mixture. Cooling water is circulated through the jacket to keep the temperature below about 60° C., and generally within 35–40° C. From 2½ to 3½ hours are required to complete the phosgenation. The charge is then filtered by suction and the diphenylurea is well washed with water and dried at about 70° C.

By this invention, diphenylurea of excellent purity may be directly obtained. Furthermore, a high yield of the desired product is obtained, averaging 94.7% for a number of runs.

While we have described a specific embodiment of our invention, it should be understood that the invention is not limited to the precise steps or ingredients since changes may be made therein by those skilled in the art without departing from the spirit of the invention or exceeding the scope of the appended claims.

We claim:

1. The process of making diphenylurea comprising making an aqueous mixture of aniline and soda ash in the ratio of about 465 parts by weight of aniline and about 380 parts by weight of soda ash in about 2500 parts by weight of water, agitating said aqueous mixture while introducing thereinto about 270 parts by weight of phosgene, continuing the agitation and maintaining the temperature of the reaction mixture within the range of from about 35° C. to about 40° C. until the phosgenation is completed.

2. A process for making diphenylurea comprising mixing aniline and an aqueous solution of soda ash for neutralizing hydrochloric acid in water and passing phosgene in the mixture while agitating it vigorously and maintaining it within a temperature range of from 30° C. to 60° C. until the phosgenation is complete.

References Cited in the file of this patent

UNITED STATES PATENTS

| | | |
|---|---|---|
| 1,393,597 | Albert | Oct. 11, 1921 |
| 2,044,355 | Kardaszewicz | June 16, 1936 |

OTHER REFERENCES

Hentschel; "Jour. fur Prak. Chemie," vol. 27 (new series), page 499 (1883).